Patented May 9, 1939

2,157,510

UNITED STATES PATENT OFFICE 2,157,510

PROCESS FOR EFFECTING ANION EXCHANGE

Oliver M. Urbain and William R. Stemen, Columbus, Ohio, assignors to Charles H. Lewis, Harpster, Ohio No Drawing. Application May 19, 1937,
Serial No. 143,628

4 Claims. (Cl. 23—1)

This invention relates to the preparation and use of silicic acid materials for the recovery or removal of inorganic anions by anion exchange processes.

More specifically, the invention relates to the preparation and use of metal silicate salts containing exchangeable anions for the treatment of liquids from which it is desired to recover or remove other anions by an exchange process.

It has long been known that certain natural materials, as well as certain synthetic materials, are capable of effecting the exchange of positive ions (i. e., cations). These materials, known as zeolites or hydrated alumino-silicates, have found wide use for softening water due to their faculty of base or cation exchange and their ease of regeneration. This cation exchange process is, in its most simple form, a pure exchange process by which the calcium and magnesium cations of the water are taken up by the zeolite, and the sodium cation is given off to the water. The regeneration is performed by washing off the zeolites, which have been saturated with calcium or magnesium cations, with a sodium chloride solution, by which means a sodium zeolite is again produced which may be reused to soften additional quantities of water. Many artificial zeolites have been prepared and are now extensively used to eliminate the hardness forming compounds from municipal and private water supplies. The fundamental characteristic of these zeolites is that they have within their structure an ionizable cation, while the rest of the compound is insoluble.

It is the purpose of our invention to provide materials which possess anion or acid exchange properties analogous to the cation or base exchange properties of the zeolites. It is further an object of our invention to provide the methods by which these materials may be prepared and the processes by which they may be utilized to effect anion or acid exchange. It is additionally an object of our invention to provide methods of regeneration of such materials. In general, it is the broad object of this invention to provide a highly novel and extremely practical anion or acid exchange process similar to that above described in the cation or base exchange field.

We have discovered that certain silicic acid compounds as hereinafter described possess the unusual property of exchanging negative ions or anions. These compounds, which we refer to as "metal silicate salts", possess the fundamental characteristics of having within their structure an ionizable anion while the rest of the compound is insoluble. The basis of our invention lies in the ability of the ionizable anion to dissociate from the insoluble portion of the molecule and exchange its position with that of another ionizable anion in liquids which are being treated.

The silicic acid compounds which we have found will effect anion exchange and which we term "metal silicate salts" are those which contain within their molecules, and attached to a silicon atom, one or more —O—M—A groups, in which "O" represents oxygen, "M" represents a polyvalent metal, and "A" represents an ionizable anion. We have found that the metal represented by "M" may be any polyvalent metal, such, for example, as calcium, magnesium, zinc, mercury, iron, aluminum, barium, tin, and strontium. Likewise, "A" can be any ionizable anion, such, for example, as Cl, $NO_3$, $SO_4$ and $PO_4$. The silicates may be meta or ortho silicates, and there may be one or more silicon atoms contained within the molecules. We do not limit our invention to materials containing these elements alone for we have found that all compounds containing the oxygen-metal-anion groupings attached to silicon will effect in varying degrees the exchange of anions.

As we have pointed out, the active portion of such compounds is the O—M—A grouping attached to silicon. In these compounds, the oxygen is attached to the silicon, the metal is attached to the oxygen, and the ionizable anion is attached to the metal by true valency forces. The silicic acid portion and the metal portion of the materials act as supports and vehicles serving as chemical conditioners to place the anion in a favorable position for ionization and exchange. The silicate portion also serves the fundamental purposes of providing high surface exposure and desired insolubility.

Since the ionizable anion is held by true valency forces, the process of anion exchange which is effected by the materials described is a substitution process in which the anions of the liquid to be treated chemically replace those of the anion exchange material in a manner analogous to base exchange or cation exchange processes now in common use. It will be observed that in our materials there is present the essential advantage that the anions are held by true valency forces in contradistinction to any physical phenomena of adsorption or like process.

Another property of these materials is their ability to effect selective anion exchange. Although all anions may be exchanged by these materials, we have found that all anions do not exchange with the same ease. By varying the conditions of operation, we may produce the desired result in varying degree.

The compounds which we have discovered will effect anion exchange are those which conform to the following general formula:

in which "M" is a metal, "A" is an anion or negative grouping, the exponents represent valences, and the subscripts represent the number of atoms or radicals taken up to form the molecule. In this formula, $b$ equals 2 or more, and $a$, $c$, $e$, and $f$ each equal 1 or more.

It is necessary that the total theoretical basicity of the silicic acids making up the active portions of our material equal:

$$[(b \times c) + g] - (e \times f)$$

in which these letters represent the values of the valences and atomic proportions shown in the general formula above. By "basicity" we mean the power of an acid to react with one or more equivalents of a base according to the number of replaceable hydrogen atoms contained in the acid. The basicity of the silicic acid component of our material results in the holding by true valency forces of the ionizable anion, and it is this ionizable anion which makes possible our process of anion exchange.

Having described in general the nature of the materials with which we may effect anion exchange, we shall now give illustrative specific examples of these materials. We give illustrative structural formulae to point out the relationship of the ionizable anions to the insoluble portions of the materials.

Barium metasilicate bromide

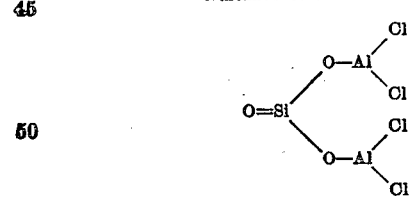

Aluminum metasilicate tetrachloride

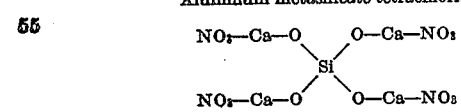

Calcium orthosilicate tetranitrate

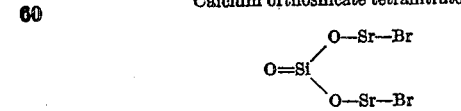

Strontium metasilicate bromide

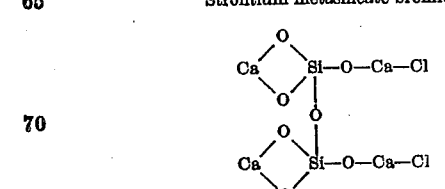

Calcium di-orthosilicate chloride

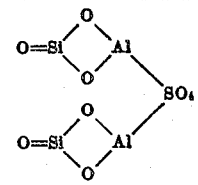

Aluminum di-metasilicate sulfate

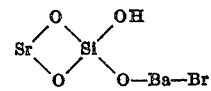

Strontium barium orthosilicate bromide

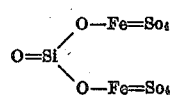

Ferric metasilicate sulfate

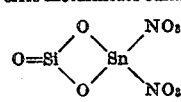

Stannic metasilicate nitrate

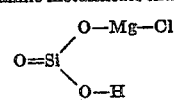

Magnesium metasilicate chloride

These are exemplary of the many compounds which may be utilized in effecting anion exchange. We have prepared many others, such as the zinc, mercury, cobalt, nickel, cadmium, and manganese silicate salts, in addition to those shown above.

We shall now describe several methods which we have utilized for preparing anion exchange compounds.

*Method No. 1.*—The metal silicate salts may be prepared by reacting silicic acids with salts of polyvalent metals.

As a specific embodiment of this method of preparation, we may take five parts of silicic acid and twenty-five parts of hydrated barium chloride, mixing them intimately and grinding them together. We may then fuse this mixture at a temperature between 500° C. and 1500° C. for a period of from one to four hours. After cooling, we wash the mass free of soluble salt, and it is ready for use. We have thus prepared a barium metasilicate chloride.

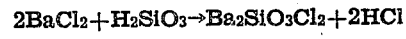

Or we may take four parts of silicic acid, eight parts of anhydrous ferric chloride, and eight parts of sodium chloride; grind these together and fuse them at a temperature between 500° C. and 1500° C. for from one half hour to three hours. We then heat the fused mass in an atmosphere of chlorine at approximately 1200° C. for one hour. After cooling, we wash the mass with water, and it is ready for use. We have thus prepared a ferric metasilicate chloride.

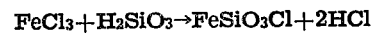

We have added the sodium chloride in this process for the mass effect of a common chloride ion.

*Method No. 2.*—A silicate of a metal which has the property of existing in two or more valency states is taken in the form of one of its lower valency states and treated with a halogen, preferably under conditions which exclude moisture, at elevated temperatures.

Exemplary reactions for the preparation of ferric metasilicate chloride and stannic orthosilicate bromide by this method are as follows:

$$2FeSiO_3 + Cl_2 \rightarrow 2FeSiO_3Cl$$
Ferrous metasilicate — Chlorine — Ferric metasilicate chloride $$Sn_2SiO_4 + 2Br_2 \rightarrow Sn_2SiO_4Br_4$$
Stannous orthosilicate — Stannic orthosilicate bromide

*Method No. 3.*—A silicate of an alkali metal may be heated or fused with an excess of an anhydrous metal halide, the valency of the metal of the metal halide being two or more. Exemplary reactions for the preparation of calcium metasilicate chloride and aluminum metasilicate tetrachloride are as follows:

$$Na_2SiO_3 + 2CaCl_2 \rightarrow Ca_2SiO_3Cl_2 + 2NaCl$$
Sodium metasilicate — Calcium chloride — Calcium metasilicate chloride $$Na_2SiO_3 + 2AlCl_3 \rightarrow Al_2SiO_3Cl_4 + 2NaCl$$
Sodium metasilicate — Aluminum chloride — Aluminum metasilicate tetra-chloride This is a fusion or metathesis method for the preparation of our material.

*Method No. 4.*—Insoluble mineral silicates may be treated with acid in the gaseous or wet condition.

In this method, the acid treatment is permitted to progress to a point just short of the break-down of the silicate, for we do not wish the treatment to result in the disintegration of the silicate. Examples of the materials which we have prepared by this method are given by these equations:

$$MgSiO_3 + HCl \rightarrow MgHSiO_3Cl$$
Magnesium metasilicate — Magnesium silicate chloride $$BaSiO_3 + HBr \rightarrow BaHSiO_3Br$$
Barium metasilicate — Barium silicate bromide Here again it is necessary for the metal of the silicate which we use to have a valence of two or more. This acid treatment method for the preparation of our material is carried out best under dry conditions at temperatures from 140° C. to 600° C.

*Method No. 5.*—An acid silicate may be heated with a salt or a hydroxide of a metal which has a valence of two or more at a temperature sufficiently high to insure complete reaction, preferably from 250° C. to 600° C. Equations illustrating the preparation of compounds by this method follow:

$$Ca_2Si_2O_7H_2 + 2CaCl_2 \rightarrow Ca_4Si_2O_7Cl_2 + 2HCl$$
Calcium acid diorthosilicate — Calcium diorthosilicate chloride $$SrSiO_4H_2 + Ba(OH)_2 \rightarrow SrBaSiO_5H_2 + H_2O$$
Strontium acid orthosilicate — Strontium barium silicate We have given above exemplary methods for preparing anion exchange materials in most of which the exchangeable anions are halides. Materials containing anions other than halides may also be prepared. The use to which the materials are to be placed will dictate the type of anion exchange materials to be prepared. For example, it may be desired to remove one particular anion from a liquid medium containing several anions. Choice of the proper material permits such selective exchange to be effected. Or it may be desired to control the nature of the effluent from the anion exchange treatment to the extent that it will contain a particular anion. This may be done by selecting a material which has as its ionizable anion that which is desired in the effluent.

Anion exchange materials other than the halides may be obtained by a method of which the following is exemplary.

*Method No. 6.*—The compounds prepared in accordance with any of the above methods may be treated with a solution containing the anion desired in the exchange material. For example, if we wish a nitrate exchange material, we may take calcium metasilicate chloride and treat this with a solution of sodium nitrate in accordance with this equation:

$$Ca_2SiO_3Cl_2 + 2NaNO_3 \rightarrow Ca_2SiO_3(NO_3)_2 + 2NaCl$$

Or we may treat an aluminum metasilicate chloride with a solution of sodium sulfate to obtain aluminum metasilicate sulfate in accordance with the following equation:

$$2AlSiO_3Cl + Na_2SO_4 \rightarrow (AlSiO_3)_2SO_4 + 2NaCl$$

In the examples of the preparation of the compounds as given above, the specific ratios which we have given are not controlling except that all the materials must be in excess over the silicic acid. In the examples given, we have used meta and ortho silicates, but we have found that the polysilicates will also function in the preparation of our material.

The materials which we have described may be used in the recovery of valuable anions and the removal of objectionable anions by the process of anion exchange. The manner of application of these materials in effecting such a process is similar to the manner of application of zeolites in the known processes of cation exchange. The liquid containing the anions which we wish to recover or remove is passed in contact with our new materials with the rate of flow dependent upon the materials being used and the anions being exchanged. Various methods for carrying out the process will be apparent to those acquainted with the water treatment art.

The following illustrative adaptations of the use of our process in effecting anion exchange are given.

We may take one of the materials made in any of the methods described above, such as barium metasilicate chloride for example, and pass through this material a liquid containing anions which we may wish to recover, for example, bromide ions. Upon analysis of the resulting effluent, we find that the bromide content has been materially reduced and is now available for recovery in the exchange material. The exchange of anions is brought about in accordance with the following formula:

$$Ba_2SiO_3Cl_2 + 2KBr \rightarrow Ba_2SiO_3Br_2 + 2KCl$$
Barium metasilicate chloride — Potassium bromide — Barium metasilicate bromide — Potassium chloride The flow of the liquid being treated may be continued until tests indicate inefficient removal of the anions being exchanged, and the exchange material may then be regenerated with recovery of the desired anion, as described below.

If it is desired to remove objectionable anions, such, for example, as the fluoride ions from potable water, we may, by using ferric metasilicate sulfate as the exchange medium, effect a reaction in accordance with the formula:

$$Fe_2SiO_3(SO_4)_2 + 4NaF \rightarrow Fe_2SiO_2F_4 + 2Na_2SO_4$$

Here we have exchanged the fluoride ions with the sulfate ions of the exchange material. The fluoride ions are now tied up in an insoluble form in the exchange material while the sulfate ions are now in solution in the effluent. We have accomplished the removal of an objectionable anion by the substitution of the unobjectionable sulfate anion in the liquid being treated.

Another adaptation of our process is in the removal of acid anions from solutions where such anions might either be detrimental or it might be desired to effect recovery. By contacting the liquid medium containing acid anions with any of the materials which are within the scope of our invention, we may effect removal of the acids. As exemplary of the removal of phosphate ions through the use of calcium diorthosilicate chloride, we show the following reaction:

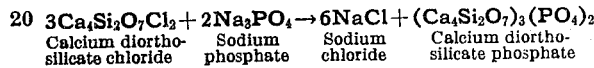
$$3Ca_4Si_2O_7Cl_2 + 2Na_3PO_4 \rightarrow 6NaCl + (Ca_4Si_2O_7)_3(PO_4)_2$$
Calcium diortho-  Sodium  Sodium  Calcium diortho-
silicate chloride  phosphate  chloride  silicate phosphate The exchange material will then contain the phosphate ion while the liquid effluent from treatment will contain sodium chloride.

Our new materials lend themselves to many other adaptations in the new field of anion exchange.

When our exchange materials have become exhausted, they may be regenerated by reversing the process of anion exchange. Those skilled in the art will recognize the available methods of regeneration. However, we describe one of the methods which we have found will completely regenerate our exhausted material. For example, we may take the exhausted anion exchange material from the above described bromine removal process and treat this with a sodium chloride solution of moderate concentration. The barium metasilicate bromide will thus be converted to barium metasilicate chloride, and the effluent from the regeneration process will contain sodium bromide in high concentration in accordance with the following equation:

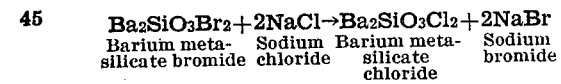
$$Ba_2SiO_3Br_2 + 2NaCl \rightarrow Ba_2SiO_3Cl_2 + 2NaBr$$
Barium meta-  Sodium  Barium meta-  Sodium
silicate bromide  chloride  silicate  bromide
                             chloride From the concentrated sodium bromide effluent solution, the bromine may be recovered by any of the ordinary conventional methods.

Or, for example, after having exhausted our calcium metasilicate chloride in the removal of the fluoride ions from potable water, the anion exchange material may be regenerated by treating with a sodium chloride solution of ten per cent concentration, more or less. The material is regenerated in accordance with the following reaction:

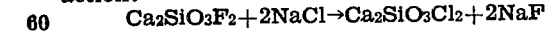
$$Ca_2SiO_3F_2 + 2NaCl \rightarrow Ca_2SiO_3Cl_2 + 2NaF$$

The fluoride ions are now found concentrated in the effluent of the regeneration process together with any unused sodium chloride, while the anion exchange material is again available for further use.

There are innumerable applications of our novel process for effecting anion exchange. We have specifically indicated the recovery of acids and halides as possible applications. Through the property of selective exchange by proper use and selection of material, we may effect removal of desired anions from liquids containing a number of ionizable salts. Our materials make possible the recovery of many types of acids from waste liquors, the recovery of which has been impractical prior to the discovery of these materials.

Reference is here made to our applications Serial Nos. 38,664, filed August 30, 1935; 51,966 and 51,967, filed November 27, 1935, of which this application is a continuation-in-part. Reference is also made here to our copending applications Serial Nos. 143,629; 143,630; 143,631; and 143,632, filed concurrently with this application, which relate to similar subject-matter.

It is to be expressly understood that the foregoing description and the examples we have given are merely illustrative and are not to be considered as limiting our invention beyond the scope of the subjoined claims.

Having thus described our invention, we claim:

1. A process for effecting anion exchange in aqueous liquids which comprises reacting the liquid containing anions with a metal silicate salt containing within its molecule, and attached to the silicon atom thereof, one or more —O—M—A groups in which O represents oxygen, M represents a polyvalent metal, and A represents an ionizable anion of a water soluble inorganic acid.

2. A process for removal and recovery of anions from aqueous liquids which comprises the steps of reacting the liquid containing the anions sought with a metal silicate salt containing within its molecule and attached to the silicon atom thereof, one or more —O—M—A groups in which O represents oxygen, M represents a polyvalent metal, and A represents an ionizable anion of a water soluble inorganic acid, regenerating the exchange compound by treating the same with anion containing solution of moderate concentration, and obtaining the anions from the effluent of the regeneration treatment.

3. A process for removal and recovery of halides from aqueous liquids which comprises the steps of reacting the liquid containing the halides with a metal silicate salt containing within its molecule and attached to the silicon atom thereof, one or more —O—M—A groups in which O represents oxygen, M represents a polyvalent metal, and A represents an ionizable anion of a water soluble inorganic acid, regenerating the exchange compound by treating the same with an anion containing solution of moderate concentration, and obtaining the halides from the effluent of the regeneration treatment.

4. A process for removal and recovery of acid anions from aqueous liquids which comprises the steps of reacting the liquid containing the acid anions with a metal silicate salt containing within its molecule and attached to the silicon atom thereof, one or more —O—M—A groups in which O represents oxygen, M represents a polyvalent metal, and A represents an ionizable anion of a water soluble inorganic acid, regenerating the exchange compound by treating the same with an anion containing solution of moderate concentration, and obtaining the acid anions from the effluent of the regeneration treatment.

OLIVER M. URBAIN.
WILLIAM R. STEMEN.